United States Patent [19]

Mueller et al.

[11] Patent Number: 5,663,122
[45] Date of Patent: Sep. 2, 1997

[54] MINERAL ADDITIVES FOR SETTING AND/OR CONTROLLING THE RHEOLOGICAL PROPERTIES AND GEL STRUCTURE OF AQUEOUS LIQUID PHASES AND THE USE OF SUCH ADDITIVES

[75] Inventors: Heinz Mueller, Monheim; Wolfgang Breuer, Korschenbroich; Claus-Peter Herold, Mettmann; Peter Kuhm, Hilden; Stephan von Tapavicza, Erkrath, all of Germany

[73] Assignee: Henkel Kommanditgesellschaft auf Aktien, Duesseldorf, Germany

[21] Appl. No.: 374,556

[22] PCT Filed: Jul. 19, 1993

[86] PCT No.: PCT/EP93/01902

§ 371 Date: Jan. 27, 1995

§ 102(e) Date: Jan. 27, 1995

[87] PCT Pub. No.: WO94/02566

PCT Pub. Date: Feb. 3, 1994

[30] Foreign Application Priority Data

Jul. 27, 1992 [DE] Germany ............ 42 24 537.0

[51] Int. Cl.$^6$ .............. C09K 7/02; C09K 7/04; C09K 7/06; B01J 13/00
[52] U.S. Cl. .............. 507/110; 252/312; 252/315.01; 252/315.5; 507/109; 507/111; 507/113; 507/117; 507/208; 507/269; 507/121; 507/140
[58] Field of Search .............. 507/109, 140, 507/208, 269, 110, 117; 252/315.01, 315.5, 312

[56] References Cited

U.S. PATENT DOCUMENTS

| | | | |
|---|---|---|---|
| 2,744,869 | 5/1956 | Darley | 507/140 |
| 4,830,765 | 5/1989 | Perricone et al. | 252/8.51 |
| 4,888,120 | 12/1989 | Mueller et al. | 252/8.551 |
| 5,194,422 | 3/1993 | Mueller et al. | 507/136 |
| 5,232,627 | 8/1993 | Burba, III et al. | 252/315.5 |

FOREIGN PATENT DOCUMENTS

| | | |
|---|---|---|
| 0122073 | 10/1984 | European Pat. Off. . |
| 0207810 | 1/1987 | European Pat. Off. . |
| 0260538 | 3/1988 | European Pat. Off. . |
| 0293191 | 11/1988 | European Pat. Off. . |
| 0396983 | 11/1990 | European Pat. Off. . |
| 0501069 | 9/1992 | European Pat. Off. . |
| 1667502 | 6/1971 | Germany . |
| 2424763 | 12/1975 | Germany . |
| 3144770 | 5/1983 | Germany . |
| 3306822 | 8/1984 | Germany . |
| 3404491 | 8/1985 | Germany . |
| 3915876 | 11/1990 | Germany . |
| 3916550 | 11/1990 | Germany . |
| 3915875 | 11/1990 | Germany . |
| 4018228 | 12/1991 | Germany . |
| 4019266 | 1/1992 | Germany . |
| 9218238 | 10/1992 | WIPO . |

OTHER PUBLICATIONS

F. Weiss, "Die Standfestigkeit flüssigkeitsgestützter Erdwände" in Bauingenieur–Praxis, No. 70 (1967), Verlag W. Ernst & Sohn, Berlin–Müchen.

"Manual of Drilling Fluids Technology", 1985, NL Baroid/NL Industries, Inc.(volume not included).

A.T. Bourgoyne Jr., et al. "Applied Drilling Engineering", Society of Petroleum Engineers, Richardson, TX, 1986.

J.L. Burba III et al. entitled "Laboratory and Field Evaluation of Novel Inorganic Drilling Fluid Additives" IADC/SPE 17198, pp. 179–186 (1988).

Deer, Howie and Zussman "Rock–Forming Minerals Orthosilicates", vol. 1A, 2nd Edition, Langman, London/New York, 1982, sub–chapter entitled Garnet Group, pp. 468–475.

E. Passaglia et al. entitled "Katoites, a New member of the $CA_3Al_2(SiO_4)_3$–$Ca_3Al_2(OH)_{12}$ Series and a New Nomenclature for the Hydrogrossular Group of Minerals" in Bull.Mineral 91984), 107, 605–618, df. in particular the sub–chapter entitled Discussion and Nomenclature loc.cit. 614–616 (1984).

C. Cohen–Addad et al. in Acta Cryst. (1967), 23, pp. 220–225, "Etude de la Substitution de Groupement $SiO_4$ par $(OH)_4$ Dans les Composés $Al_2Ca_3(OH)_{12}$ et $Al_2Ca_3(SiO_4)_{2.16}(OH)_{3.36}$ de Type Grenat".

George R. Gray and O.C.H. Darley, entitled "Composition and Properties of Oil Well Drilling Fluids", 4th Edition, 1980/81, Guld Publishing Company, Houston.

M.E. Chenevert "Glycerol Additive Provides Shale Stability" in Oil & Gas Journal, Jul. 1989, 60–64.

D. Green et al. "Glycerol–based Mud System Resolves Hole Sloughing Problems" in World Oil, Sep. 1989, 50/51.

*Primary Examiner*—Richard D. Lovering
*Attorney, Agent, or Firm*—Ernest G. Szoke; Wayne C. Jaeschke; Real J. Grandmaison

[57] ABSTRACT

The invention concerns the use of mixed hydroxydes of bivalent and trivalent metals with a three-dimensional spaced-lattice structure of the garnet type to control the thixotropic thickening of aqueous preparations, using swellable clays and/or other swellable layer-silicate compounds of natural and/or synthetic origin as visosity-increasing agents. The preferred garnet-type mixed hydroxydes are catoites of the basic structure $Ca_3Al_2(OH)_{12}$ a minor proportion of whose OH units can be exchanged for acid groups, in particular silicate groups.

18 Claims, No Drawings

MINERAL ADDITIVES FOR SETTING AND/OR CONTROLLING THE RHEOLOGICAL PROPERTIES AND GEL STRUCTURE OF AQUEOUS LIQUID PHASES AND THE USE OF SUCH ADDITIVES

FIELD OF THE INVENTION

This invention relates generally to the rheology control of aqueous liquid phases using viscosity builders based on swellable minerals of natural and/or synthetic origin.

This application is a 371 of PCT/EP93/01902, filed Jul. 19, 1993, which claims priority based on Federal Republic of Germany application P 4224 537.0 filed Jul. 27, 1992.

The thickening of water-based systems using fine-particle swellable clays and/or other layer silicate compounds of natural or synthetic origin is widely used in practice. The various fields of application involved utilize the possibility which this affords of thixotropic thickening of the aqueous or water-based liquid phases. The treatment of solid materials, particularly metals, the field of fire extinguishing materials, the use of thixo-tropically thickened liquid phases in water-based paints or coating compositions, hydraulic liquids and the like are mentioned here without any claim to completeness. Totally different applications can be found, for example, in the production of cosmetic preparations, in the production of water-based active-substance preparations in the form of ointments or gels and numerous other fields.

Water-based auxiliary liquids thixotropically thickened to a more or less considerable extent are widely used in the technology of geological drilling and other terrestrial drilling operations and also for other applications, for example as ground supports in digging operations, more particularly in slotted wall construction; in shaft, well and caisson sinking; in the driving through of pipes and the like. A literature reference on the subject of the constructional application of thixotropic liquid systems is, for example, F. Weiss, "Die Standfestigkeit flüssigkeitsgestützter Erdwäande" [Title in English: The Stability of Earthen Walls supported by Liquids] in Bauingenieur-Praxis [Title in English: Structural Engineering Practice], No. 70 (Verlag W. Ernst & Sohn, Berhn-München, 1967). Water-based drilling fluids that are sufficiently thickened by the addition of mineral viscosity generators without losing their flowability or pumpability under shear stressing and that—depending on the particular situation—contain additional dissolved, emulsified and/or suspended auxiliaries are widely used. However, many other liquid auxiliaries used in the field m question—for example for stimulation, fracturing, spotting or simply for cleaning—are water-based liquid phases which have been thickened with inorganic viscosity generators of the type in question; see for example the printed publications MANUAL OF DRILLING FLUIDS TECHNOLOGY (NL Baroid/NL Industries, Inc., 1985) and A. T. Bourgoyne Jr, et al., *Applied Drilling Engineering* (Society of Petroleum Engineers, Richardson, Tex., 1986).

The present invention as described hereinafter is largely concerned with, but is by no means limited to, auxiliary liquids for use in the field of terrestrial drilling. In the context of the invention, the expression "terrestrial drilling" is also meant to be broadly interpreted and encompasses both the development of geological deposits, such as petroleum and/or natural gas, and auxiliary drilling, for example, for undertunneling, river crossing, the opening of deposit fields, water drilling and the like.

The mineral viscosity generators used for controlling the rheology of aqueous drilling fluids are swellable clays of natural and/or synthetic origin. Examples are corresponding smectites, such as montmorillonite, bentonitc, beidellite, hectoritc, saponite and stevensite. Attapulgite is another important water-swellable auxiliary of the type in question. A number of proposals are concerned with the synthetic production of fine-particle clay-like minerals, more particularly corresponding compounds of the hectoritc and/or saponite type, cf. DE-A-16 67 502 and in particular EP-B-0 260 538. The disclosure of the last document in particular, which describes a development of the assignee of this application, is hereby included as part of the disclosure of the present invention.

By selecting suitable natural or synthetic swellable minerals, it is possible very largely to control the particular rheological properties required which, as already known, can be numerically expressed in particular through the plastic viscosity (PV), the yield point (YP) and the gel strength, determined in each case before and after ageing under standard conditions. Full relevant particulars can be found, for example, in the above-cited publication *MANUAL OF DRILLING FLUIDS TECHNOLOGY* of NL Baroid.

EP-A-0 207 810 relates to mineral-based systems for building up viscosity in water-based liquid phases. The water-swelling layer silicates known per se, such as clays of the sodium bentonitc or attapulgite type, are said to be used in conjunction with selected synthetic mineral mixed oxides which are distinguished by a specific individual structure. This structural feature, which is emphasized as crucial, is the crystalline monolayer structure of the mixed metal hydroxides per unit cell. These layer crystals are said to be present in "monodispersed" form in a liquid carrier, so that the individual crystals form separate layers of the mixed metal hydroxide compounds.

The teaching of EP-A-0 207 810 is based on the observation that mixed crystals of the type in question, individualized into monolayers, are capable of interacting with the swellable clays typically used for developing viscosity and, in the process, influence the rheological properties of the water-based thickened liquid phase, but at the same time promote other, more penetrative effects required in practice, for example are capable of inhibiting clays. Information on the composition and mode of action of these mineral auxiliaries of synthetic origin known as mixed metal layered hydroxide compounds (MMLHC) can be found in the publication by J. L. Burba III et al. entitled "Laboratory and Field Evaluation of Novel Inorganic Drilling Fluid Additive", *IADC/SPE* 17198, pages 179–186.

DESCRIPTION OF THE INVENTION

Object of the Invention

The problem addressed by the present invention was to provide a class of mineral auxiliaries which—similarly to the teaching of the last literature reference discussed in the foregoing—could be used as additives in aqueous or water-based liquid phases where they could selectively influence the property spectrum of the thickened liquid phase in conjunction with natural and/or synthetic, swellable mineral viscosity generators known per se.

SUMMARY OF THE INVENTION

The technical teaching of the invention described in the following is based on the surprising observation that this—in many respects improved—control of the properties of thickened aqueous phases is possible with a class of mineral compounds which differ fundamentally from the monolayer crystals of the MMLHC type.

The teaching according to the invention is based on the surprising realization that fine-particle mineral auxiliaries of the garnet type with a space-filling three dimensional space lattice structure are effective auxiliaries in the context of the problem addressed by the invention and, through the property spectrum of the thickened liquid phases, can lead to a hitherto unknown combination of desirable properties.

In a first embodiment, therefore, the present invention relates to the use of preferably fine-particle, solid mixed hydroxide compounds of divalent and trivalent metals with a three dimensional space lattice structure of the garnet type for controlling the thickening, more particularly the thixotropic thickening, of aqueous preparations by swellable clays and/or other swellable layer silicate compounds of natural and/or synthetic origin.

The present invention also relates to additives for adjusting and/or controlling the rheology and gel strength of aqueous liquid phases which are thickened, preferably thixotropically, using synthetic and/or natural mineral compounds, more particularly swellable clays and/or other layer silicate compounds. The additives according to the invention—often referred to hereinafter as "controllers"—contain as their essential component fine-particle mixed hydroxide compounds of selected divalent and trivalent metals with a three dimensional space lattice structure of the garner type, the OH functions of the garnet structural also being partly replaceable by monobasic and/or polybasic acid moieties. The above-mentioned controllers may be used in admixture with other inorganic and/or organic auxiliaries for adjusting and/or controlling the flow behavior or rather the thickening of aqueous phases. The most important controllers in the context of the invention are compounds from the phase range of katoites, more particularly of synthetic origin, of the type defined in detail hereinafter.

In another particularly important embodiment, the invention relates to water-based flowable and pumpable working fluids thickened with viscosity generators based on swellable clay minerals or layer silicates of natural and/or synthetic origin and optionally containing other dissolved, emulsified and/or suspended auxiliaries, more particularly auxiliary fluids for use in terrestrial drilling and/or terrestrial well sinking operations. The teaching according to the invention is characterized by the use of the above-defined controllers of the garnet type with their three dimensional space lattice structure in conjunction with the swellable viscosity generators of the sodium bentonite type and/or other swellable minerals.

DETAILED DESCRIPTION OF THE INVENTION, INCLUDING PREFERRED EMBODIMENTS

Synthetic and/or natural minerals of the crystalline garnet structure type with their three dimensional space-filling space lattice structure are described, for example, in Deer, Howie and Zussman, *Rock-Forming Minerals Orthosilicates*, Vol. 1A, 2nd Edition (Langman, London/New York, 1982), sub-chapter entitled "Garnet Group", pages 468–475.

Corresponding compounds of garnet structure which may be assigned to the phase range of katoites are particularly suitable in the context of the teaching according to the invention, cf. the article by E. PASSAGLIA et al. entitled "Katoites, a New Member of the $Ca_3Al_2(SiO_4)_3$—$Ca_3Al_2(OH)_{12}$ Series and a New Nomenclature for the Hydrogrossular Group of Minerals" in Bull. Mineral., 107, 605–618 (1984); cf. in particular the sub-chapter entitled "Discussion and Nomenclature", loc. cit. 614–616.

Like grossular $Ca_3Al_2(SiO_4)_3$, which is formed by complete replacement of the hydroxyl groups by $SiO_4$ units, and the minerals lying in between, in which the $SiO_4$ groups are partly replaced by OH groups, synthetic karoite $Ca_3Al_2(OH)_{12}$, completely free from $SiO_4$, is a mineral of the garnet group which is distinguished by a specific crystal lattice and thus differs from other calcium/aluminum hydroxy compounds and which is also known as hydrogarnet. The crystal lattice, together with lattice intervals in the crystal of katoite, is described in detail, for example, in the article by C. Cohen-Addad et al. in "Etude de la Substitution du Groupement $SiO_4$ par $(OH)_4$ Dans les Composés $Al_2Ca_3(OH)_{12}$ et $Al_2Ca_3(SiO_4)_{2.16}(OH)_{3.36}$ de Type Grenat" [Title in English: Study of the Substitution of the Group $SiO_4$ by $(OH)_4$ in the Compounds $Al_2Ca_3(OH)_{12}$ and $Al_2Ca_3(SiO_4)_{2.16}(OH)_{3.36}$ of the Garnet Type], Acta Cryst., 23, pages 220–225 (1967). In the $SiO_4$-free variant, therefore, the aluminum is octahedrally surrounded by 6 oxygens still bearing a hydrogen. The calcium is surrounded by 8 oxygens which form a distorted cube—also referred to as a three-face dodecahedron. OH elements may be replaced by equivalent quantities of $SiO_4$ units without any basic change in the structure.

Compounds of this type and hence of the type defined in accordance with the invention are obviously also capable of interacting with mineral swellable viscosity builders of the type hitherto used in aqueous suspension and of initiating basic property changes in the composition of the thickened, more particularly water-based liquid phase. Firstly, it is noticeable that—compared, for example, with sodium bentonite as a known viscosity builder—very much smaller quantities of bentonite are sufficient to obtain a substantial increase in the yield point GYP) of the liquid system by addition of small quantifies of the garnet-type controllers. By using the controllers according to the invention, the thixotropic character of the thickened liquid phase differs from the property spectrums hitherto achieved not only is the yield point moved upwards using comparatively small quantities of the viscosity-building constituents; this effective gelation of the system can be initiated, for example, without the gel strengths being pushed upwards to an extent comparable with the prior art. Accordingly, it is possible to obtain low-solids aqueous auxiliary liquids which may be used, for example, in the field of drilling fluids and which provide a combination of properties hitherto unobtainable in known water-based drilling muds. The liquid, which at rest is present as a solid paste, soon liquefies under the effect of light shear forces. Rock cuttings, cement residues to be removed from the intermediate cementing stage or even large metal fragments which are formed during milling and which have to be removed from the bore holes, possibly even from considerable depths, are transported without problems by the aqueous gel formed in accordance with the invention. On the other hand, the solids can be quickly and effectively removed from the drilling sludge above ground. The rapid and intensive change in viscosity under the effect of shear forces leads to a flowability of the substantially gel-like mass through pipes, channels and the like which may be regarded as substantially water-like flow. Hardly any forces are applied to the gel component, so that the flow profile closely resembles the idealized plug flow. Without any claim to completeness, the following effects are also obtained: aqueous preparations using the controllers according to the invention with their three dimensional space lattice structure show high pseudoplasticity with low N-values for small contents of viscosity builders of the sodium bentonite or corresponding clay type. Fresh water and salt water, particularly seawater, may be used to form the thickened liquid phases. The gel structures formed in accordance with the invention are stable at high temperatures and are largely unaffected by the usual impurities, for example in the field of geological drilling.

In broad terms, garnet-type mixed hydroxide compounds of preferably synthetic origin corresponding to general formula I below are defined as controllers in the context of the invention:

$$M^{II}_a M^{III}_b (OH)_{2a+3b-n \cdot m} A^n_m \qquad (I)$$

In this general formula:

$M^{II}$=Ca, Mg, Zn, Cu, Ba, Sr, Fe, Mn and/or Co $M^{III}$=Al, Fe, Cr and/or Ga A=monobasic and/or polybasic acid moieties with the valency n, preferably halide, sulfate, nitrate, carbonate, silicate, phosphate and/or borate a=a number of about 2 to 4 and preferably about 3 b=a number of about 1 to 3 and preferably about 2.

The ratio of a to b is in the range from 1:1 to 3:1 and is preferably 3:2. Finally, the product of n·m is a number of 0 to about 6, preferably below 4 and, more particularly, below 1.

The most important representatives of the garnet-type mixed hydroxide compounds corresponding to the above general formula belong to the classes of hydro-grossulars and katoites defined in the literature cited above. The most important representatives of the controllers according to the invention are katoites corresponding: to general formula I, in which all 12 negative positions of the garnet crystal are occupied by OH groups—in other words: compounds corresponding to general formula I in which there are no additional acid moieties A and, hence, m=[$Ca_3Al_2(OH)_8SiO_4$]. However compounds in which a small number of the hydroxyl groups in the katoite just defined are replaced by acid groups A are similarly important. Particular significance is attributed in this regard to the $SiO_4$ unit which stoichiometrically corresponds to 4 hydroxyl groups and hence replaces them in the crystal structure [$Ca_3Al_2(OH)_8SiO_4$]. However, the particularly preferred katoites according to the invention contain very small numbers of $SiO_4$ units so that—in the context of general formula (I)—the value of m is distinctly below 1, for example up to about 0.5 or even only up to 0.3. In the case of the katoite/grossular mixed crystal types, values for m in the range from 0.005 to 0.1 can be particularly suitable representatives of controllers according to the invention.

Broadly speaking, the generally synthetically produced controllers of general formula I according to the invention may contain considerable quantities of water of hydration. The production of these garnet-type controllers, which is described in detail hereinafter, is generally carded out in aqueous solution. However, the reaction product formed corresponding to general formula I is largely insoluble in water. It may be used in aqueous suspension or in the form of a dry powder. The individual particle size of the katoite crystals is preferably no greater than about 250 μm, smaller particle sizes, particularly in the range from about 0.01 to 100 μm, being preferred. It can be of particular advantage to use powders having an average particle size of from about 0.1 to 30 μm. Products of this type may readily be synthesized.

The particularly preferred katoites $Ca_3Al_2(OH)_{12}$ or their partial substitution products with monobasic and/or polybasic inorganic acid moieties contain such foreign structural elements in the form of the acid moieties preferably in quantities of at most about 50 mole-% and suitably in quantities of no more than about 20 to 30 mole-%, more particularly in quantities of no more than 10 mole-% and preferably in quantities of no more than about 1 to 3 mole-% or distinctly below 1 mole-% of the OH elements in the basic unit of the garnet type.

However, the divalent and/or trivalent metal units in katoites corresponding to the above formula may be partly replaced by other metal units of comparable valency. For example, it is likely that, in practice, a certain percentage of the calcium units will often be replaced by corresponding percentages of alkaline earth metal ions, particularly magnesium. The reason for this is that technical grades of calcium oxides or hydroxides contain certain percentages of magnesium as an impurity. It is a particular advantage of the teaching according to the invention that no particular purification is necessary to obtain highly effective controllers of katoite structure according to the invention.

The compounds corresponding to general formula I and, in particular, the corresponding katoites may be prepared from the respective hydroxides of the divalent end trivalent metals, for example in accordance with the teaching of DE-C-24 24 763. Basically, the production of synthetic components of this type is known from the prior art, see for example the literature references cited earlier on E. Passaglia et al., loc. cit. and C. Chonen-Addad et al., loc. cit. The following observations, for example, may be made in this regard:

The compounds of formula (I) to be used in accordance with the invention and, in particular, the katoites may be prepared in known manner, for example from the hydroxides or oxides of calcium and aluminum, by precipitation in the aqueous system, optionally with addition of silicate ions, for example in the form of waterglass. The presence of alkali, preferably in the form of aqueous solutions of sodium hydroxide, is advisable in this regard. According to the invention, it is particularly simple to prepare the katoites corresponding to formula (I) in a precipitation reaction from sodium aluminate liquors with aqueous suspensions of calcium hydroxide or calcium oxide, optionally with addition of silicate ions, particularly waterglass. This production variant is particularly inexpensive because sodium aluminate liquors accumulate, for example, in the Bayer process for the production of bauxite. The quantities of calcium and aluminum used may be in the molar range. However, larger quantities of the starting materials may also readily be used because katoites corresponding to general formula (I) are always formed and the excesses of calcium or aluminum hydroxide, for example, remain unchanged.

Production from sodium aluminates, which is preferred in accordance with the invention, is preferably carded out by adding the oxide or hydroxide of calcium in the form of an aqueous dispersion to the sodium aluminate liquor. It is advisable subsequently to heat the reaction mixture to temperatures in the range from 50° to 150° C. The reaction is generally complete after 0.1 to 10 hours.

The synergistic interaction of the controllers defined in accordance with the invention and the mineral thickeners based on natural and/or synthetic clays or other swellable layer silicate compounds used in conjunction with the controllers is broadly in evidence precisely for the swellable viscosity generators used in accordance with the prior art. In addition to the most important thickeners of the bentonite and attapulgite type used in practice, the following classes of minerals are mentioned as further examples of viscosity builders of mineral origin: kaolinite, halloysite, smectites, montmorillonites, saponites, vermiculites, sepiolite, fuller's earths and the like.

In one important embodiment, the controllers according to the invention, particularly those of the katoite type, preferably present in the form of flee-flowing powers, are used together and in admixture with selected known swellable viscosity builders. Accordingly, the teaching of the invention in this embodiment is characterized by the use of "controller mixtures" in which one component is a controller of the above-described type with a three dimensional space lattice structure of the garnet type, which is present in admixture with inorganic and/or organic viscosity builders. In the case of the inorganic viscosity builders, the viscosity builders used as mixture components in the controller mixture may be the same as or different from the swellable minerals which are used as principal components for developing viscosity and which are modified by the addition of the controllers in accordance with the invention. The swellable components optionally used in the controller mixture are also referred to hereinafter as "controller mixture components". Through their presence in the controller mixture and their selection in regard to type and quantity, it is possible to modify the controller effect and hence ultimately to modify the property spectrum of the thickened aqueous phases.

Although, basically, the controllers according to the invention and the controller mixture components used in admixture therewith may be mixed in largely any ratios, particularly where mineral mixture components are used, the following requirements still have to be satisfied in regard to mixtures of this type. In one important embodiment, the controller mixture component(s) are used in at most substantially the same quantities, based on the quantity in which the controller according to the invention with its three dimensional space lattice structure is initially introduced. It can be useful in this regard to limit the quantity of mineral controller mixture component(s) to at most 20 or 30% by weight of the controller solids mixture to be used, quantities of from about 2 to 20% by weight and, more particularly, from about 5 to 15% by weight (based again on controller solids mixture) of swellable synthetic and/or natural clay mineral being particularly suitable for the controller mixture component(s).

In one important embodiment, the layer silicates described in EP-B-0 260 538 cited in the foregoing, more particularly from the class of smectites, are used as swellable synthetic controller mixture components, particular significance being attributed in this regard to corresponding synthetic hectorites and/or synthetic saponites. Compounds of this type are characterized by general formula II:

MgO.aMA.bAl$_2$O$_3$.cSiO$_2$.nH$_2$O  (II)

in which

M=Na$^+$ and, optionally, also Li$^+$ for an Na to Li ratio of or greater than 1

A=F$^-$, OH$^-$ and, optionally, also ½ O$^2$ a=0.1 to 0.6, b=0 to 0.3, c=1.2 to 1.7 and n=0 to 3.0.

Synthetic hectorites of this type are particularly important mixture components for this preferred embodiment of the teaching according to the invention of controller mixtures. Information on the constitution of these swellable layer silicate compounds can be found in the cited literature reference of which the disclosure has already been included as part of the disclosure of the present invention.

However; other important controller mixture components are other, more particularly mineral, components of layered structure of the hydrotalcite type described, for example, as crystalline basic aluminum magnesium carbonate in DE-C-33 06 822. Particularly interesting controller mixture components in the present context of synthetic layer minerals are, in particular, the synthetic mineral oxides described in the above-cited EP-A-0 207 810. It has surprisingly been found that, through the use of the controller components with their three dimensional garnet structure according to the invention in conjunction with the MMLHC compounds according to this literature reference, it is possible to obtain synergistic enhancements of effect in regard to the increase in viscosity of the water-based phase which are clearly superior to the results obtained where the MMLHC compounds are used solely in combination with swellable clays in accordance with the teaching of EP-A-0 207 810. In particular, it is possible in this combination to increase the yield point (YP) to the high levels required, but at the same time to keep the gel strength at the low levels required. Information on the chemical constitution and production of the controller mixture components of the MMLHC type used in this embodiment of the invention can be found in EP-A-0 207 810, the disclosure of which is hereby included as part of the disclosure of the present invention. Basically, the controllers of general formula (I) according to the invention and the MMLHC used as controller mixture components may be mixed in any ratios, for example in the range from 95:5 to 5:95 (parts by weight of the components present in the mixture). In a preferred embodiment, however, the percentage of MMLHC used as controller mixture component does not exceed the quantity of the controllers of general formula (I) according to the invention to a significant extent, if at all. It has been found that distinct synergistic enhancements of effect can be obtained even with very small quantities of the MMLHC, for example 5 to 20% by weight (% by weight, based on the sum of controller and controller mixture component).

In another embodiment, the controllers or controller mixtures according to the invention may be used in conjunction with basic oxides and/or hydroxides, particularly of polyvalent metals. This is particularly advantageous when the liquids to which the controller mixtures are added are used at temperatures above 100 ° C. Particularly favoarable theological properties are obtained in this way. Corresponding oxides and hydroxides of Mg, Ca, Zn, Al and/or Fe are preferred. In this case, too, the controllers and the metal oxides or hydroxides may be mixed in virtually any ratios, although in this case, too, at least about 50% by weight of the mixture should preferably be formed by the controllers according to the invention with their three dimensional garnet structure. The ratios mentioned above in conjunction with the swellable controller mixture components of mineral origin may be correspondingly applied in this case, too. The embodiment of the invention discussed in this paragraph is of particular significance for the following reason:

In the production of the katoite compounds, the steric garnet structure is formed even in the presence of an excess of individual metal oxide components in the reaction mixture. According to the invention, the establishment of certain mixing ratios between the controllers according to the invention and the metal oxides or hydroxides used in conjunction therewith may thus be controlled from the outset. For a number of applications, for example in conjunction with drilling fluids containing alkali reserves for the development of geological deposits or in cases where the fluids are used at temperatures above 100° C., this represents a simple method of producing effective mixture components which may be used in many ways in practice.

The ratios between the controller or controller mixture defined in accordance with the invention and the known mineral-based viscosity builders used in the thickening of aqueous systems controlled in accordance with the invention may be varied within wide limits. For example, ratios of controller to mineral viscosity builder of 0.02:1 to 2:1 are suitable, ratios of about 0.1:1 to 1:1 being preferred; in other words the controller is preferably used in small to at most substantially equal quantities, based on the swellable mineral viscosity builder according to the invention.

As already mentioned, organic polymer compounds may be used together with the controllers and the inorganic swellable viscosity builders to enable the property spectrum of the water-based auxiliaries ultimately obtained to be varied and/or optimized. The organic polymer compounds may be present as controller mixture components, i.e. in direct admixture with the katoites, or may be separately added to the water-based auxiliaries to be thickened. Any of the polymer compounds typically encountered in the technology in question may be used in conjunction with the controllers of general formula (I) according to the invention. Examples of these polymer compounds are starch, carboxymethyl starch, carboxymethyl cellulose, carboxymethyl hydroxyethyl cellulose, hydroxyethyl cellulose, lignin derivatives, lignites and/or chromolignites, alginates, pro-propoxylated alginates, xanthan and other bacterial polysaccharides and general synthetic polymers. However, polymer compounds which have been specifically developed for use at high temperatures in the field in question are preferably used for an extremely important embodiment of the invention, namely for the use of the drilling and well servicing fluids at high temperatures of, for example, 150° C. and higher.

Suitable high-temperature-resistant polymers for the applications in question are, for example, synthetic polyvinyl sulfonic acids, more particularly corresponding homopolymers or even selected sulfonated styrene polymers, more especially corresponding copolymers of vinyl sulfonic or styrene sulfonic acid with vinyl acylamides and, if desired, acrylamide and/or methacrylamide. The relevant prior art literature is represented, for example, by DE-A-31 44 770 or EP-A-0 122 073. However, the polymer compounds described, for example, in DE-A-34 04 491 also fall within the scope the preferred embodiment of the invention where the controllers corresponding to general formula (I) are used in conjunction with temperature-stable polymer components. Combinations of this type may be used in drilling fluids and/or corresponding well servicing fluids which are used at temperature above 175° C. and, more particularly, at temperatures of at least 200° C.

The organic polymer compounds are used in the quantities typically encountered in the field of particular importance to the invention, namely drilling fluids and/or other well servicing fluids; of the relevant prior art cited in the foregoing, for example EP-B-0 260 538.

In one important embodiment, the teaching according to the invention is of particular importance in conjunction with the synthesis of water-based well servicing fluids, more particularly drilling fluids, which contain a disperse organic oil phase, particularly one capable of flowing at operating temperatures, in finely emulsified form together with the thickened aqueous phase. It is known that drilling fluids of this type are o/w emulsions which, in terms of their performance properties, occupy a central position between purely aqueous systems and oil-based invert drilling muds. Detailed information on this subject can be found, for example, in the textbook by George R. Gray and O. C. H. Darley, entitled *Composition and Properties of Oil Well Drilling Fluids,* 4th Edition (Gulf Publishing Company, Houston, 1980/81) and the extensive specialist and patent literature cited therein. O/w drilling fluids of this type are typically 3-phase systems of oil, water and fine-particle solids.

In the context of the present invention, particular significance is attributed to such o/w emulsions. Preferred embodiments are characterized by the use of ecologically safe disperse oil phases based in particular on at least substantially water-insoluble alcohols, correspondingly water-insoluble ethers and esters of mono- and/or polycarboxylic acids and comparable carbonic acid esters; of the relevant publications and patent the assignee of this application and its employees applications filed by namely DE-A-39 15 875, DE-A-39 15 876, DE-A-39 16 550, DE-A-40 18 228 and DE-A40 19 266. Information on the embodiment of the present invention in question here (o/w emulsions with viscosity control of the aqueous phase through the use of the controllers according to the invention with their three dimensional garnet structure, particularly katoite) can be found in the disclosure of these relevant documents, the disclosure of which is hereby included as part of the disclosure of the present invention.

In connection with water-based well servicing fluids, particularly drilling fluids, particular significance can be attributed to the addition of auxiliaries for inhibiting minerals that are highly sensitive to water and are encountered during drilling. Recent developments in this regard include inter alia the use of water-soluble polyalcohols, such as polyglycols, the use of glycerol, crosslinked and/or uncrosslinked oligoglycerols and/or or polyglycerols and comparable compounds; cf. for example EP-A-0 293 191 (glycerol and/or polyglycerols), U.S. Pat. No. 4,830,765 (polyhydric alcohols, glycol, glycol ethers, polypropylene glycols, polyethylene glycols, ethylene oxide/propylene oxide copolymers, alcohol-initiated EO/PO copolymers and mixtures thereof), M. E. Chenevert, "Glycerol Additive Provides Shale Stability" in Oil & Gas Journal, July 1989, 60–64 and D. Green et al., "Glycerol-based Mud System Resolves Hole Sloughing Problems" in *WORLD OIL,* September 1989, 50/51. The control and adjustment of viscosity by the measures taken in accordance with the invention is also of importance in connection with correspondingly modified water-based well servicing fluids.

In the embodiment of the invention under discussion here, the viscosity-controlled water-based drilling auxiliaries may contain any of the additives normally used in comparable fluids. These additives may be soluble in water, soluble in oils and/or dispersible in water and oils. Known additives for water-based o/w emulsions used as drilling fluids are, for example, emulsifiers, fluid loss additives, alkali reserves, preparations for inhibiting the unwanted exchange of water between drilled formations and the water-based drilling fluid, wetting agents to enable the emulsified oil phase to be better absorbed on solid surfaces, for example for improving the lubricating effect, disinfectants and the like. Further information in this regard can again be found in the relevant prior art as represented, for example, by the work of Gray and Darley, loc. cit. However, further detailed information can also be found in the above cited patent applications by the assignee of this application on o/w-emulsion-based drilling fluids.

EXAMPLES

Example 1

Using commercial fine-particle sodium bentonite, an aqueous suspension containing 4.5% by weight of bentonite was prepared by intensively stirring the powder-form mineral into tap water (water phase). The pH value is adjusted to 11 with 30% sodium hydroxide. The bentonite suspension thus prepared is left standing overnight at room temperature.

The following characteristic values of this aqueous suspension are determined as blank values:

Plastic viscosity (PV) in cP

Yield point (YP) in lb/100 ft$^2$

Gel strength—10 secs. and 10 mins.—in lb/100 ft$^2$.

A controller mixture according to the invention, as described in the following, is added to separate samples of the aqueous bentonite suspension, increasing quantities of the controller mixture being used in the individual, separate samples. The controller used as a powder-form mixture or the corresponding controller mixture is stirred into the aqueous bentonite suspension over a period of 20 minutes using an intensive mixer, after which the rheological characteristics mentioned above are determined, first immediately after incorporation and then after ageing for 16 hours at room temperature. The results obtained are set out in Table 1 below. The values determined after ageing for 16 hours at room temperature are shown in parentheses after the values for the fresh material.

The controller mixture used in accordance with the invention is used in the form of a dry powder consisting of the following components:

90% by weight of a very weakly silicate modified katoite—$SiO_4$ content, based on the silicate-free katoite unit $Ca_3Al_2(OH)_{12}$, less than 0.1 $SiO_4$ units 10% by weight of a highly swellable synthetic hectorite according to EP-B-0 260 538.

TABLE 1

| Sample | PV | YP | Gel Strength: 10 sec | 10 min |
|---|---|---|---|---|
| 4.5% by weight of bentonite suspension, pH 11, in tap water | 5 (5) | 5 (6) | 4 (3) | 16 (17) |
| +0.5% by weight of controller mixture | 2 (3) | 51 (47) | 23 (25) | 26 (30) |
| +0.75% by weight of controller mixture | 3 (4) | 52 (52) | 17 (26) | 20 (27) |
| +1.0% by weight of controller mixture | 2 (4) | 52 (56) | 17 (26) | 26 (31) |
| +3.0% by weight of controller mixture | 5 (6) | 62 (68) | 20 (55) | 26 (58) |
| +5% by weight of controller mixture | 6 (9) | 86 (91) | 25 (28) | 20 (36) |

Example 2

An 8% by weight bentonite suspension in tap water is first prepared as described scribed in Example 1 and then diluted with water from the North Sea in a ratio of 1:1. The characteristic data mentioned in Example 1, namely PV, YP and gel strength (10 secs and 10 mins), are again determined, the results obtained from the freshly prepared material being set out in Table 2 below. The controller mixture according to the invention used in this and the following Examples corresponds to the material described in Example 1. In this and the following Examples, as in Example 1, the respective test series relate to separate samples.

TABLE 2

| Sample | PV | YP | Gel Strength: 10 sec | 10 min |
|---|---|---|---|---|
| 8% by weight of bentonite suspension in tap water, diluted with North Sea water in a ratio of 1:1 | 3 | 5 | 5 | 10 |
| +0.25% by weight of controller mixture | 6 | 45 | 16 | 14 |
| +0.50% by weight of controller mixture | 6 | 68 | 25 | 18 |
| +1.0% by weight of controller mixture | 11 | 81 | 26 | 20 |

Example 3

A 4.5% by weight bentonite suspension in tap water is prepared as described in Example 1 and then mixed with synthetic seawater in a ratio of 1:1. In Table 3 below, the measured rheological data of this low-bentonite suspension are compared with the values measured after addition of increasing quantities of the controller mixture according to the invention.

TABLE 3

| Sample | PV | YP | Gel Strength: 10 sec | 10 min |
|---|---|---|---|---|
| 4.5% by weight of bentonite suspension in tap water, diluted with synthetic sea water in a ratio of 1:1 | 3 | 2 | 3 | 2 |
| +0.1% by weight of controller mixture | 3 | 9 | 13 | 14 |
| +0.2% by weight of controller mixture | 3 | 11 | 7 | 9 |
| +0.25% by weight of controller mixture | 3 | 12 | 6 | 9 |
| +0.5% by weight of controller mixture | 3 | 16 | 8 | 10 |

Example 4

A 4.5% by weight bentonite suspension in tap water is adjusted to pH 11 with 30% sodium hydroxide. The controller mixture of Example 1 is added to a first portion of this suspension in a quantity of 0.5% by weight.

0.5% by weight of a controller mixture having the following composition (in % by weight, based on the controller mixture as a whole) is added to a second part of the aqueous bentonite suspension:

90% by weight of the controller mixture of Example 1

10% by weight of a synthetic mineral mixed oxide of the MMLHC type according to EP-A-0 207 810

0.5% by weight of the mineral mixed oxide of the MMLHC type is added to a third part of the aqueous bentonite suspension without the controller or controller mixture according to the invention based on the three dimensional katoite compound.

In every case, the powder-form controller or controller mixture is incorporated into the aqueous sodium bentonite suspension by intensive stirring for 20 minutes using a multimixer.

The rheological data determined are set out in Table 4 below.

TABLE 4

| Sample | PV | YP | Gel Strength: 10 sec | 10 min |
|---|---|---|---|---|
| 4.5% bentonite suspension + 0.5% by weight of controller mixture according to Example 1 | 5 | 46 | 30 | 35 |
| 4.5% bentonite suspension + 0.5% by weight of controller mixture according to Example 1 (90) and MMLHC (10) | 8 | 60 | 22 | 20 |
| 4.5% bentonite suspension + 0.5% by weight of MMLHC | 3 | 67 | 60 | 45 |

Table 4 shows the following: the yield point (YP) is distinctly increased in all three comparison tests. However, the low gel strengths required are only achieved where a controller or controller mixture according to the invention is used.

Example 5

A mixed hydroxide compound according to the invention of garnet structure, in which—in contrast to katoite—all the aluminum units had been replaced by corresponding amounts of iron, was used as controller for this Example without the addition of a controller mixing component. This garnet-type controller was also very lightly silicate-modified, i.e. the $SiO_4$ content, based on the silicate-free structural unit $Ca_3Fe_2(OH)_{12}$, was less than 0.1 $SiO_4$ unit. This iron-containing controller was produced similarly to katoite from the metal(II) and (III) hydroxides in alkaline medium, as described above.

In accordance with Example 1, the iron-containing controller was stirred into a 4.5% by weight bentonite suspension and the suspension was alkalinized. The rheological characteristics of the material—obtained by addition of increasing quantities of the controller according to the invention—before and after ageing for 16 hours (values in parentheses) are shown in Table 5 below.

TABLE 5

| Sample Controller | PV | YP | Gel Strength: 10 sec | 10 min |
|---|---|---|---|---|
| 0.2% by weight | 6 (7) | 11 (11) | 19 (19) | 24 (25) |
| 0.3% by weight | 4 (7) | 36 (38) | 48 (59) | 52 (40) |
| 0.4% by weight | 5 (4) | 64 (65) | 62 (66) | 28 (30) |
| 0.5% by weight | 10 (10) | 82 (77) | 77 (73) | 34 (33) |
| 0.7% by weight | 6 (6) | 36 (35) | 49 (36) | 15 (18) |
| 1.0% by weight | 4 (6) | 26 (22) | 32 (28) | 13 (11) |

The yield point (YP) passes through a maximum which lies at a controller concentration of 0.5% by weight. The behavior of the gel strengths in this Example may also be similarly evaluated.

Example 6

A mixed hydroxide compound of garnet structure according to the invention, in which—in contrast to karoitc—all the calcium units had been replaced by corresponding amounts of zinc, was used as controller for this Example without addition of a controller mixing component. This garnet-type controller was also very lightly silicate-modified, i.e. the $SiO_4$ content, based on the silicate-free structural unit $Zn_3Al_2(OH)_{12}$, was less than 0.1 $SiO_4$ unit. This zinc-containing controller was produced as described in Example 5.

The tests were carried out as described in Example 1. Table 6 below shows the rheological characteristics of the material measured before and after ageing for 16 hours (values in parentheses).

TABLE 6

| Sample Controller | PV | YP | Gel Strength: 10 sec | 10 min |
|---|---|---|---|---|
| 0.3% by weight | 5 (6) | 10 (14) | 19 (26) | 28 (25) |
| 0.5% by weight | 5 (4) | 22 (25) | 23 (19) | 23 (25) |

Example 7

Katoites with various silicate contents were used as controllers for this Example without the addition a controller mixing component. The $SiO_4$ content, based on the silicate-free katoite unit $Ca_3Al_2(OH)_{12}$, was between 0.02 and 0.25 $SiO_4$ unit.

A constant controller concentration of 0.5% by weight was used in all the tests. The tests were carried out as described in Example 1. Table 7 below shows the theological characteristics of the material as measured before and after ageing for 16 hours (values in parentheses).

These results show that the most favorable silicate content in the katoite is 0.04 to 0.05 mole $SiO_4$ per mole of katoite corresponding to formula I.

TABLE 7

| Sample Silicate Content | PV | YP | Gel Strength: 10 sec | 10 min |
|---|---|---|---|---|
| 0.02% by weight | 4 (2) | 46 (45) | 49 (48) | 30 (21) |
| 0.03% by weight | 5 (3) | 44 (40) | 47 (52) | 26 (21) |
| 0.04% by weight | 4 (2) | 45 (50) | 49 (47) | 27 (28) |
| 0.05% by weight | 2 (2) | 43 (49) | 50 (48) | 31 (24) |
| 0.06% by weight | 3 (2) | 35 (45) | 49 (49) | 20 (24) |
| 0.12% by weight | 5 (3) | 22 (34) | 44 (48) | 46 (28) |
| 0.25% by weight | 5 (6) | 20 (27) | 23 (33) | 23 (28) |

The invention claimed is:

1. Water-based flowable and pumpable working fluids comprising (A) viscosity builders selected from the group consisting of swellable clay minerals and layer silicates; and (B) rheology controllers comprising mixed metal hydroxide compounds of divalent and trivalent metals with a three dimensional space lattice structure of the garnet type, in which the OH moieties may be partly replaced by mono- and/or poly-basic acid moieties, said rheology controllers conforming to the structural formula I:

$$M^{II}_a M^{III}_b (OH)_{2a+3b-n \cdot m} A^n_m \qquad (I)$$

wherein $M^{II}$ represents one or more divalent cations selected from the group consisting of Ca, Mg, Zn, Cu, Ba, Sr, Fe, Mn and Co; $M^{III}$ represents one or more trivalent cations selected from the group consisting of Al, Fe, Cr and Ga; A represents an anionic moiety with a valency of n, a represents a number from 2 to 4; b represents a number from 1 to 3; each of m and n is a number; the ratio of a to b is in the range from 1:1 to 3:1 and the product n·m is a number from 0 to about 6.

2. Flowable and pumpable working fluids as claimed in claim 1, which are water-based drilling fluids of the o/w emulsion type containing oils as the disperse phase.

3. Flowable and pumpable working fluids as claimed in claim 2, wherein the ratio by weight of rheology controllers to the total of swellable clay and swellable layer silicates is from 0.1:1 to 1:1.

4. Flowable and pumpable working fluid as claimed in claim 3, additionally comprising at least one of water soluble polymers and water swellable polymers.

5. Flowable and pumpable working fluids as claimed in claim 1 wherein $M^{II}$ is predominantly Ca and may optionally include Mg, $M^{III}$ is Al, A is silicate, and m is less than 0.1.

6. Flowable and pumpable working fluids as claimed in claim 5, wherein the ratio by weight of theology controllers to the total of swellable clay and swellable layer silicates is from 0.1:1 to 1:1.

7. Flowable and pumpable working fluids as claimed in claim 6, additionally comprising at least one of water soluble polymers and water swellable polymers.

8. Flowable and pumpable working fluids as claimed in claim 1 wherein the ratio by weight of theology controllers to the total of swellable clay and swellable layer silicates is from 0.1:1 to 1:1.

9. Flowable and pump working fluids as claimed in claim 8, additionally comprising at least one of water soluble polymers and water swellable polymers.

10. Flowable and pumpable working fluids as claimed in claim 1, wherein the rheology controllers are selected from the group consisting of compounds conforming to general formula I below:

$$M^{II}_a M^{III}_b (OH)_{2a+3b-n \cdot m} A^n_m \qquad (I),$$

wherein $M^{II}$ represents one or more divalent cations selected from the group consisting of Ca, Mg, Zn, Cu, Ba, Sr, Fe, Mn and Co; $M^{III}$ represents one or more trivalent cations selected from the group consisting of Al, Fe, Cr and Ga; A represents an anionic moiety with a valency of n; a represents a number from 2 to 4; b represents a number from 1 to 3; each of m and n is a number the ratio of a to b is in the range from 1:1 to 3:1 and the product n·m is a number from 0 to about 6.

11. Flowable and pumpable working fluids as claimed in claim 10, wherein $M^{II}$ is predominantly Ca and may optionally include Mg, $M^{III}$ is Al, A is silicate, and m is less than 0.1.

12. Flowable and pumpable working fluids as claimed in claim 11, wherein the ratio by weight of rheology controllers to the total of swellable clay and swellable layer silicates is from 0.1:1 to 1:1.

13. Flowable and pumpable working fluids as claimed in claim 12, additionally comprising at least one of water soluble polymers and water swellable polymers.

14. Flowable and pumpable working fluids as claimed in claim 10, wherein the ratio by weight of rheology controllers to the total of swellable clay and swellable layer silicates is from 0.1:1 to 1:1.

15. Flowable and pumpable working fluids as claimed in claim 14, additionally comprising at least one of water soluble polymers and water swellable polymers.

16. Flowable and pumpable working fluids as claimed in claim 1, additionally comprising a component selected from the group consisting of basic metal oxides and hydroxides.

17. An additive for adjusting the rheology and gel strength of aqueous liquid phases, said additive consisting essentially of:

(A) rheology controllers selected from the group consisting of compounds conforming to general formula I below:

$$M^{II}_a M^{III}_b (OH)_{2a+3b-n \cdot m} A^n_m \qquad (I),$$

wherein $M^{II}$ represents one or more divalent cations selected from the group consisting of Ca, Mg, Zn, Cu, Ba, Sr, Fe, Mn and Co; $M^{III}$ represents one or more trivalent cations selected from the group consisting of Al, Fe, Cr and Ga; A represents an anionic moiety with a valency of n; a represents a number from 2 to 4; b represents a number from 1 to 3; each of m and n is a number; the ratio of a to b is in the range from 1:1 to 3:1 and the product n·m is a number from 0 to about 6, said rheology controllers having a three dimension space lattice structure of the garnet type and at least one of the following components:

(B) an amount of swellable clay, swellable layer silicates, or both that is equal to from 2 to 25% by weight of the rheology controller present;

(C) an amount of crystalline monolayer structure mixed metal layered hydroxide compounds that is equal to from 5 to 20% of the total of rheology controller, swellable clay, and swellable layer silicates present; and (D) an amount of a component selected from the group consisting of basic metal oxides and hydroxides that is equal to from 2 to 100% of the amount of rheology controller present.

18. An additive as claimed in claim 17, including an amount that is equal to from 5 to 18% of the amount of rheology controller present of compounds corresponding to general formula II:

$$MgO.aMA.bAl_2O_3.cSiO_2.nH_2O \qquad (II),$$

in which M represents $Na^+$ or $Na^+$ and $Li^+$ with an Na to Li ratio not less than 1; A represents $F^-$, $OH^-$, ½ $O^{2-}$, or a mixture of any two or more thereof; a is a number from 0.1 to 0.6; b is a number from 0 to 0.3; c is a number from 1.2 to 1.7; and n is a number from 0 to 3.0.

* * * * *